(12) United States Patent
Mori

(10) Patent No.: US 7,150,302 B2
(45) Date of Patent: Dec. 19, 2006

(54) TIRE BEAD CORE AND PNEUMATIC TIRE

(75) Inventor: Shinichi Mori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 216 days.

(21) Appl. No.: 11/035,975

(22) Filed: Jan. 18, 2005

(65) Prior Publication Data

US 2006/0157181 A1 Jul. 20, 2006

(51) Int. Cl.
*B60C 15/04* (2006.01)
(52) U.S. Cl. .......................... 152/540; 245/1.5
(58) Field of Classification Search ............... 152/540; 345/1.5
See application file for complete search history.

(56) References Cited

U.S. PATENT DOCUMENTS 3,949,800 A * 4/1976 Lejeune ....................... 152/540
4,406,317 A * 9/1983 Merten ....................... 152/540

FOREIGN PATENT DOCUMENTS

| JP | 49-119301 A1 | 11/1974 |
| JP | 09-066712 A1 | 3/1997 |
| JP | 10-095210 A1 | 4/1998 |

* cited by examiner

*Primary Examiner*—Adrienne C. Johnstone
(74) *Attorney, Agent, or Firm*—Rader, Fishman & Grauer PLLC

(57) ABSTRACT

A tire bead core has an annular body formed by annularly winding and bundling one bead wire in the form of a quadrangle in cross section which has two pairs of opposing sides substantially parallel to each other. The annular body comprises a plurality of winding portions radially stacked, each of which comprises sections of the bead wire annularly wound so as to align in a widthwise direction of the bead core. A winding portion of the annular body located radially outward is displaced to one side of the widthwise direction with respect to a winding portion of the annular body located radially inward.

8 Claims, 2 Drawing Sheets

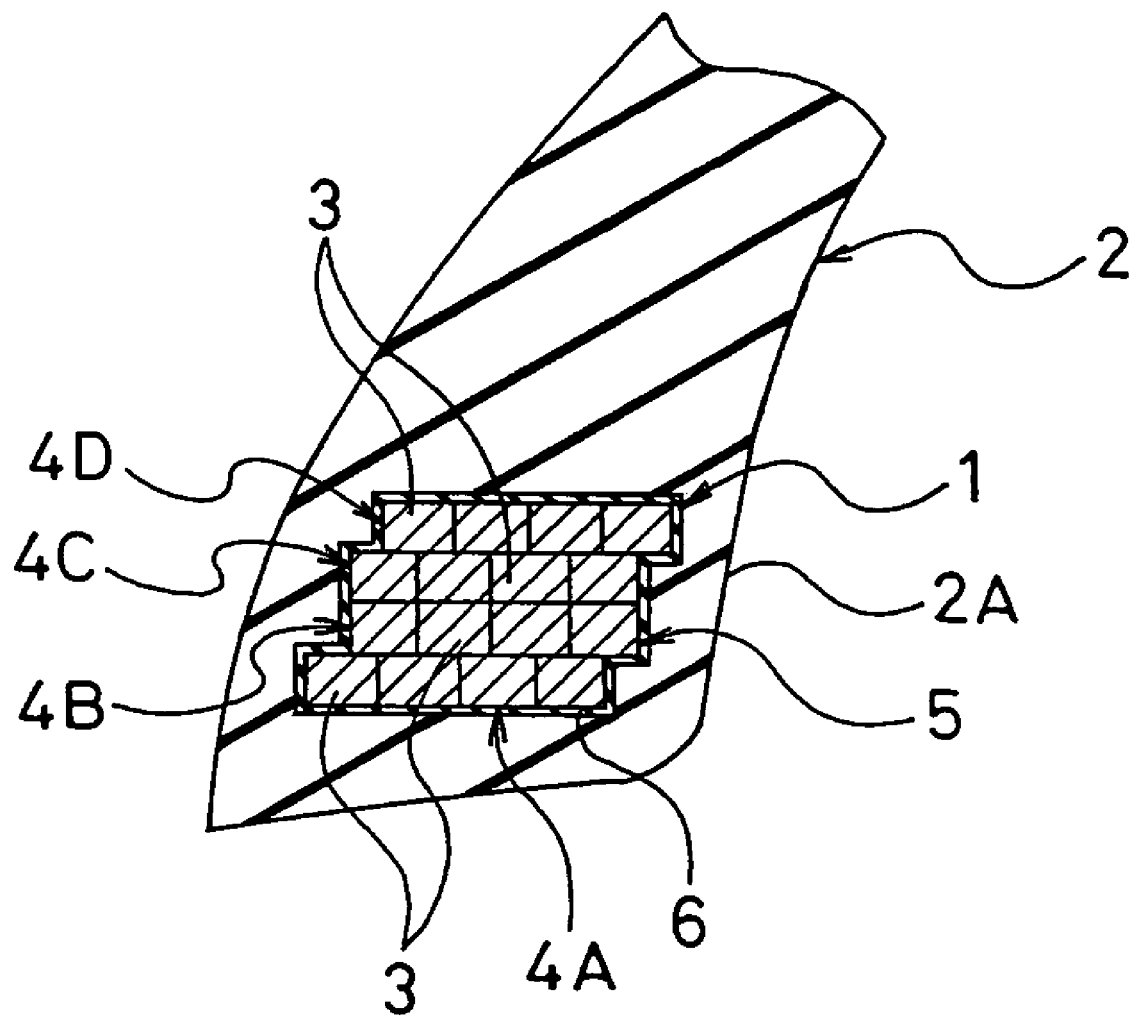

TIRE BEAD CORE AND PNEUMATIC TIRE

BACKGROUND OF THE INVENTION

The present invention relates to a bead core used for a pneumatic tire and a pneumatic tire using the same, and more particularly, to a tire bead core and a pneumatic tire which can suppress torsion and deformation of the bead core to thereby improve driving stability.

Bead cores are embedded in bead portions of a pneumatic tire in order to ensure a fitting ability to a rim. Such bead cores are generally formed such that a cross-sectionally circular or oval bead wire covered with rubber is annularly wound and bundled in the form of a circle or hexagon in cross section, or is annularly wound and bundled, and further twisted in the form of a quadrangle in cross section.

The bead cores using the above cross-sectionally circular bead wire are such that bead wire portions next to each other contact at one point via covered rubber portions, and when a large lateral force is applied to a vehicle during cornering at a high speed and a large torsion force acts on the tires, the bead cores are distorted. As a result, the bead portions attached to the rim are distorted, thereby decreasing driving stability.

To solve the above problem, conventionally, for example, Unexamined Japanese Patent Application Publication Nos. 9-66712, 10-95210, and 49-119301 disclose bead wires with a quadrangular cross section such as a rectangular cross section used for a bead core of a pneumatic tire. The bead core comprises an annular body consisting of a plurality of winding portions radially stacked; the winding portions are formed from such a cross-sectionally quadrangular bead wire; each winding portion comprises sections of the bead wire annularly wound a plurality of times so as to align in a widthwise direction of the bead core in such a manner that the sections of the wound bead wire next to each other are in contact with each other. Since a contacting area between respective bead wire sections increases, the torsion of the bead core is suppressed, and driving stability is enhanced.

The above-mentioned bead core is, however, deformed in the cured tire; as a result, the bead core does not provide an effective tightening function contemplated in designing; the deformation of the bead core is one of the causes that deteriorates driving stability.

SUMMARY OF THE INVENTION

An object of the present invention is to provide a tire bead core and a pneumatic tire using the same in which torsion and deformation of the bead core can be suppressed to thereby improve driving stability.

In order to achieve the above object, a tire bead core according to the present invention includes an annular body formed by annularly winding and bundling one bead wire in a form of a quadrangle in cross section which has two pairs of opposing sides substantially parallel to each other, the annular body comprising a plurality of winding portions radially stacked, each winding portion comprising sections of the bead wire annularly wound so as to align in a widthwise direction of the bead core, wherein a winding portion of the annular body located radially outward is displaced to one side of the widthwise direction with respect to a winding portion of the annular body located radially inward.

A pneumatic tire according to the present invention includes bead portions, a tire bead core being embedded in each of the bead portions, the bead core having an annular body formed by annularly winding and bundling one bead wire in a form of a quadrangle in cross section which has two pairs of opposing sides substantially parallel to each other, the annular body comprising a plurality of winding portions stacked radially of the tire, each winding portion comprising sections of the bead wire annularly wound so as to align axially of the tire, wherein a winding portion of the annular body located radially outwardly of the tire is displaced axially outwardly of the tire with respect to a winding portion of the annular body located radially inwardly of the tire.

According to the present invention, a radially outwardly located winding portion of the annular body is displaced to one side of the widthwise direction to bring the cross-sectional shape of the bead core close to a stable cross-sectional shape that is not subject to deformation of the bead core during curing, thereby enabling the deformation of the tire bead core to be suppressed during curing, which lowers a tightening force of the bead core contemplated in designing.

The use of the cross-sectionally rectangular bead wire for a tire bead core allows for increase in a contacting area between each section of the bead wire bundled, whereby the tire bead core can be inhibited from being distorted due to large lateral forces applied during cornering. Accordingly, the torsion and deformation of the tire bead core can be suppressed, thereby enhancing driving stability.

Since the tire bead core can provide an efficient tightening function, disengagement resistance of the tire to a rim during running can also be improved.

BRIEF DESCRIPTION OF THE DRAWINGS

FIG. 3 is a cross-sectional view showing another alternative embodiment of a tire bead core according to the present invention, embedded in a bead portion of a pneumatic tire.

DESCRIPTION OF THE PREFERRED EMBODIMENTS

Embodiments of the present invention will be described in detail below with reference to the drawings.

Figure 1:
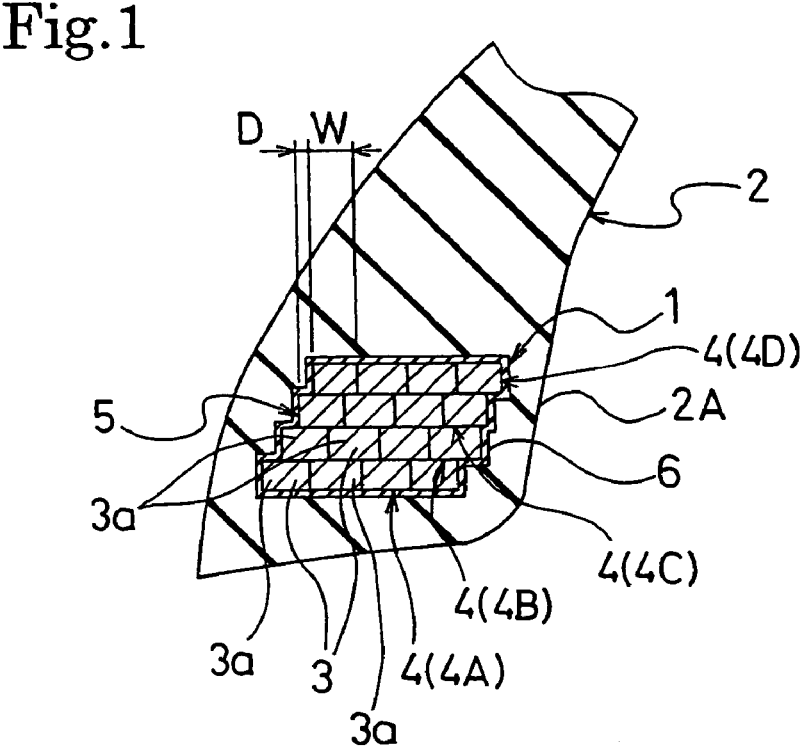
FIG. 1 is a cross-sectional view showing an embodiment of a tire bead core according to the present invention, embedded in a bead portion of a pneumatic tire.

Referring to FIG. 1, there is shown an embodiment of a bead core for a tire according to the present invention, and reference numeral 1 denotes an annular tire bead core embedded in a bead portion 2A of a pneumatic tire 2. Although not shown in the drawing, the pneumatic tire 2 has a carcass ply disposed inside the tire, each end portion of the carcass ply being turned up around the bead core 1 from an inner side of the tire towards an outer side thereof. A plurality of belt plies are provided radially outwardly of the carcass ply in a tread portion.

The tire bead core 1 includes an annular body 5 formed by annularly winding and bundling one bead wire 3 formed from a hard drawn steel wire in the form of a rectangle in cross section, and a rubber layer covering the annular body 5.

The annular body 5 consists of a plurality of winding portions 4 radially stacked, each winding portion 4 comprising sections 3a of the bead wire 3 annularly wound a plurality of times so as to align in a widthwise direction of the bead core 1 in such a manner that the sections 3a of the wound bead wire 3 next to each other are in contact with each other. The plurality of winding portions 4 comprise a first winding portion 4A, a second winding portion 4B disposed radially outwardly of the first winding portion, a third winding portion 4C disposed radially outwardly of the second winding portion, and a fourth winding portion 4D radially outwardly of the third winding portion.

The second winding portion 4B disposed on the first winding portion 4A is displaced to one side of the widthwise direction with respect to the first winding portion 4A, the third winding portion 4C disposed on the second winding portion 4B is displaced to one side of the widthwise direction with respect to the second winding portion 4B, and the fourth winding portion disposed on the third winding portion 3C is displaced to one side of the widthwise direction with respect to the third winding portion 3D, the winding portion 4 located radially more outwardly of the bead core 1 being more displaced to one side of the widthwise direction, the bead core 1 having a cross-sectional shape which is substantially in the form of a parallelogram.

The rubber layer 6 is provided for retention of the shape of the annular body 5 during formation and vulcanization of the tire, and for ensuring adherence of the bead core 1 to rubber therearound in the bead portion 2A, and may be formed of rubber known in the art. For example, a rubber which has a JIS A hardness of 71 to 75, a 100% modulus of 3.5 to 4.1 MPa at 100° C., a breaking strength of 6.9 to 7.8 MPa at 100° C. and a breaking elongation of 170 to 210% at 100° C. is preferably employed for the rubber layer.

The above-mentioned bead core 1 is disposed in each bead portion 2A of a pneumatic tire 2, as shown in FIG. 1, in such a manner that the winding portion 4 located radially more outwardly of the bead core 1 is displaced axially more outwardly of the tire.

The inventor dismantled a number of cured tires, made observations on the state of deformation of the bead cores after curing and has found the following through an intense study. That is, a pneumatic tire is generally cured after set in a tire mold with an inner pressure being applied thereto. During curing, the bead core receives the inner pressure, which causes the wound and bundled bead wire to be displaced and deformed.

The inventor paid attention to the cross-sectional shapes of the bead cores which have been deformed in the cured tires. The deformed bead cores may have been displaced radially of the tire, but each of them was deformed substantially in the from of a parallelogram in cross section in such a manner that the winding portion of the wound and bundled bead wire located radially more outward was displaced axially more outwardly of the tire. This result is caused by the bead cores which tried to come into a stable state during curing, and if the bead cores are formed to have the stable cross-sectional shapes from the beginning, the deformation of the bead cores can be prevented during curing.

Based on the finding described above, in the present invention, the tire bead core 1 has the annular body 5 in which the winding portion 4 located radially more outward is displaced more to one side of the widthwise direction, as described above, and the bead core 1 is placed in each bead portion 2A as mentioned above to have a stable cross-sectional shape from the beginning. The deformation of the bead core 1 can, therefore, be restricted during curing, and as a result, the bead core can provide an effective tightening function contemplated in designing.

The use of the cross-sectionally rectangular bead wire 3 for the tire bead core 1 allows for increase in a contacting area between each section 3a of the bead wire 3, and therefore, when large lateral forces are applied to a vehicle during cornering, the tire bead cores 1 of the pneumatic tire 2 can be inhibited from being distorted. Accordingly, the torsion and deformation of the tire bead core 1 can be suppressed, thereby improving driving stability.

The tire bead core 1 can provide an efficient tightening function, thereby enhancing disengagement resistance of the tire to a rim during running as well.

In the present invention, the displacement amount D between the winding portions 4A, 4B, 4C and 4D adjacent to each other is preferably in the range of 10% to 50% of a width W of the bead wire 3. In the embodiment shown in FIG. 1, each of the sections 3a of the bead wire 3 constituting a radially outward winding portion 4 is displaced with respect to a corresponding one of the sections 3a of the bead wire 3 constituting a radially inward winding portion 4 adjacent thereto by the same displacement amount, but may be displaced by different displacement amounts.

If the displacement amount D is less than 10% of the bead wire width W, it is difficult to effectively suppress deformation of the tire bead core 1 during curing. If the displacement amount D is greater than 50% of the bead wire width W, it is difficult to provide an effective function of the bead core because the displacement amount is too large. More preferably, the displacement amount D is in the range of 20% to 40% of the bead wire width W, thereby more effectively suppressing deformation of the tire bead core 1 during curing and providing a more effective function of the bead core. By obtaining the displacement amount D that is equal to or more than 20% of the bead wire width W, the tire-radial displacement of the bead core can also be restricted when tire-radial forces act on the tire during curing.

In the above embodiment, the bead wire 3 is rectangular in cross-sectional shape, but is not limited thereto. The bead wire 3 may be in the form of a quadrangle in cross section which has two pairs of opposing sides parallel to each other, such as a rectangle, square, parallelogram or lozenge in cross section. Quadrangles in cross section having two pairs of opposing sides parallel to each other, referred here, also include quadrangles in cross section with two pairs of opposing sides parallel to each other and with their corners being cut, and shapes that have four sides consisting of circular arcs having a large curvature radius, two pairs of opposing sides of the four sides being substantially parallel to each other.

Figure 2:
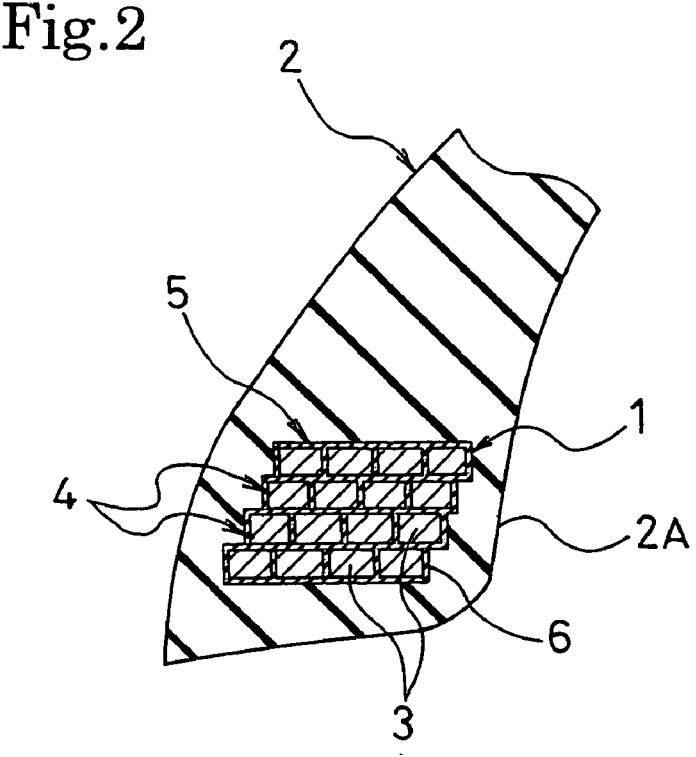
FIG. 2 is a cross-sectional view showing an alternative embodiment of a tire bead core according to the present invention, embedded in a bead portion of a pneumatic tire.

The tire bead core 1 may be formed, as shown in FIG. 2, using the bead wire 3 covered with a rubber layer 6 in the alternative of the structure having an annular body 5 entirely covered with a rubber layer 6.

It is preferable that the tire bead core 1 be formed, as described above, such that the winding portion 4 located radially more outward is displaced more to one side of the widthwise direction; however, the tire bead core 1 may be formed such that a radially outwardly located winding portion 4 is displaced to one side of the widthwise direction with respect to a radially inwardly located winding portion 4 to thereby bring the cross-sectional shape of the bead core 1 close to the stable cross-sectional shape that suppresses deformation of the bead core during curing; one example is shown in FIG. 3, in which the second and third winding portions 4B and 4C are displaced to one side of the widthwise direction with respect to the first winding portion 4A radially inwardly thereof, and the fourth winding portion 4D is displaced to one side of the widthwise direction with respect to the second and third winding portions 4B and 4C radially inwardly thereof.

The tire bead core 1 of the present invention is applicable to any of pneumatic tires.

EXAMPLE

Prepared for testing, respectively, were tires according to the present invention tire, comparison tires 1 and 2 and prior art tire, having a tire size of 195/65R15, the present invention tire having tire bead cores shown in FIG. 1, the comparison tire 1 having the same construction as the present invention tire except that each bead core was formed from a cross-sectionally oval bead wire, the comparison tire 2 having the same construction as the comparison tire 1 except that the displacement amount D between the winding portions adjacent to each other was zero, the prior art tire having the same construction as the present invention tire except that the displacement amount D between the winding portions adjacent to each other was zero. In the present invention tire and comparison tire 1, the displacement amount D between the winding portions adjacent to each other was 20% of the bead wire width W.

Each test tire had a carcass ply extending between the bead portions, both end portions of the carcass ply being turned up around the bead cores embedded in the bead portions from inner sides of the tire toward outer sides thereof, two belt plies being disposed radially outwardly of the carcass ply in the tread portion.

The test tires were subjected to evaluation testing for driving stability in the following measurement method, obtaining the results shown in Table 1.

Driving Stability

The test tires were seated on 15×6 JJ sized rims, inflated to an air pressure of 200 kPa, and mounted on a vehicle of 2000 cc displacement. Feeling testing for driving stability was conducted by a test driver in a dry road test course, and the evaluation results were represented by an index where the prior art tire was 100.

TABLE 1

|  | Prior Art Tire | Present Invention Tire | Comparison Tire 1 | Comparison Tire 2 |
| --- | --- | --- | --- | --- |
| Driving Stability | 100 | 110 | 90 | 86 |

As can be seen from Table 1, the present invention tire can improve driving stability.

The invention claimed is:

1. A tire bead core having an annular body formed by annularly winding and bundling one bead wire in a form of a quadrangle in cross section which has two pairs of opposing sides substantially parallel to each other, the annular body comprising a plurality of winding portions radially stacked, each winding portion comprising sections of the bead wire annularly wound so as to align in a widthwise direction of the bead core which is parallel to the rotation axis of the bead core, wherein a winding portion of the annular body located radially outward is displaced to one side of the widthwise direction with respect to a winding portion of the annular body located radially inward, wherein the winding portion located radially more outward is displaced more to the one side of the widthwise direction, and wherein a displacement amount between the winding portions adjacent to each other is 10% to 50% of a width of the bead wire.

2. A tire bead core according to claim 1, wherein the displacement amount is 20% to 40% of the width of the bead wire.

3. A tire bead core according to claim 1, wherein the annular body is covered with rubber.

4. A tire bead core according to claim 1, wherein the bead wire is covered with rubber.

5. A pneumatic tire having bead portions, a tire bead core being embedded in each of the bead portions, the bead core having an annular body formed by annularly winding and bundling one bead wire in a form of a quadrangle in cross section which has two pairs of opposing sides substantially parallel to each other, the annular body comprising a plurality of winding portions stacked radially of the tire, each winding portion comprising sections of the bead wire annularly wound so as to align parallel to the rotation axis of the tire, wherein a winding portion of the annular body located radially outwardly of the tire is displaced axially outwardly of the tire with respect to a winding portion of the annular body located radially inwardly of the tire, wherein the winding portion located radially more outwardly of the tire is displaced axially more outwardly of the tire, and wherein a displacement amount between the winding portions adjacent to each other is 10% to 50% a of a width of the bead wire.

6. A pneumatic tire according to claim 5, wherein the displacement amount is 20% to 40% of the width of the bead wire.

7. A pneumatic tire according to claim 5, wherein the annular body is covered with rubber.

8. A pneumatic tire according to claim 5, wherein the bead wire is covered with rubber.

* * * * *